United States Patent
Clapp et al.

(10) Patent No.: US 11,926,463 B2
(45) Date of Patent: Mar. 12, 2024

(54) ANTIMICROBIAL BOTTLE WITH ANTIMICROBIAL SEAL

(71) Applicant: Microban Products Company, Huntersville, NC (US)

(72) Inventors: Jonathan Robert Clapp, Leicestershire (GB); Ivan Wei Kang Ong, Charlotte, NC (US); Glenner Marie Richards, Davidson, NC (US)

(73) Assignee: Microban Products Company, Huntersville, NC (US)

( * ) Notice: Subject to any disclaimer, the term of this patent is extended or adjusted under 35 U.S.C. 154(b) by 0 days.

(21) Appl. No.: 16/154,040

(22) Filed: Oct. 8, 2018

(65) Prior Publication Data

US 2019/0106262 A1 Apr. 11, 2019

Related U.S. Application Data

(60) Provisional application No. 62/569,654, filed on Oct. 9, 2017.

(51) Int. Cl.
| | | |
|---|---|---|
| *A01N 43/40* | (2006.01) | |
| *A01N 25/34* | (2006.01) | |
| *A01N 31/16* | (2006.01) | |
| *A01N 59/16* | (2006.01) | |
| *B65D 1/02* | (2006.01) | |
| *B65D 23/02* | (2006.01) | |
| *B65D 41/04* | (2006.01) | |
| *B65D 41/34* | (2006.01) | |
| *B65D 81/28* | (2006.01) | |

(52) U.S. Cl.
CPC ............ *B65D 81/28* (2013.01); *A01N 25/34* (2013.01); *A01N 31/16* (2013.01); *A01N 43/40* (2013.01); *A01N 59/16* (2013.01); *B65D 1/0207* (2013.01); *B65D 23/02* (2013.01); *B65D 41/0442* (2013.01); *B65D 41/045* (2013.01); *B65D 41/3409* (2013.01); *B65D 2251/20* (2013.01); *B65D 2555/02* (2013.01)

(58) Field of Classification Search
CPC .. B65D 81/28; B65D 1/0207; B65D 41/0442; B65D 23/02; B65D 41/3409; B65D 41/045; B65D 2251/20; B65D 2555/02; A01N 25/34; A01N 59/16; A01N 31/16; A01N 43/40; A01N 25/10
See application file for complete search history.

(56) References Cited

U.S. PATENT DOCUMENTS

| | | | |
|---|---|---|---|
| 836,677 A * | 6/1906 | Frey | |
| 4,485,064 A * | 11/1984 | Laurin | A61J 1/1443 215/317 |
| 5,154,325 A | 10/1992 | Ryder et al. | |
| 5,906,825 A | 5/1999 | Seabrook, Jr. et al. | |
| 6,179,141 B1 * | 1/2001 | Nakamura | B65D 1/023 215/261 |
| 2007/0231295 A1 | 10/2007 | Hoppe et al. | |
| 2014/0170238 A1 | 6/2014 | Cliff et al. | |

FOREIGN PATENT DOCUMENTS

| | | |
|---|---|---|
| BE | 1022214 B1 | 3/2016 |
| GB | 2 337 035 A | 11/1999 |
| JP | H103219946 A | 9/1991 |
| WO | 9510940 A1 | 4/1995 |
| WO | 0038552 A1 | 7/2000 |

OTHER PUBLICATIONS

International Search Report and Written Opinion of corresponding application PCT/US2018/054923, dated Dec. 7, 2018, all enclosed pages cited.
Supplementary European Search Report, European Application No. EP 18865605, dated Jun. 2, 2021, 2 pages.

* cited by examiner

*Primary Examiner* — Aradhana Sasan
(74) *Attorney, Agent, or Firm* — Shumaker, Loop & Kendrick, LLP

(57) ABSTRACT

A bottle, having an antimicrobial property is provided. The bottle has one or more components including a body, a cap, a seal, and a locking ring. One or more of the components of the bottle are treated with an antimicrobial agent or comprise an antimicrobial agent. The antimicrobial is a silver based antimicrobial, a silver-glass antimicrobial, or other antimicrobial agent.

15 Claims, 2 Drawing Sheets

ANTIMICROBIAL BOTTLE WITH ANTIMICROBIAL SEAL

CROSS-REFERENCE TO RELATED APPLICATIONS

This application claims priority from provisional U.S. Patent Application Ser. No. 62/569,654, filed Oct. 9, 2017 in the United States Patent and Trademark Office. The disclosure of which is incorporated by reference in its entirety.

FIELD OF THE INVENTION

The present invention relates to a bottle having an antimicrobial property, more particularly to a bottle having an antimicrobial property in its body, walls, cap, locking ring, and a seal.

BACKGROUND OF THE INVENTION

According to recent research and published articles, bottled water contains more bacteria than tap water and some brands have been found to harbor levels 100 time above permitted levels.

In a study conducted by Texas Southern University, 35 different brands of bottled water were tested for biological contamination and other national and international guidelines for drinking water quality. The types of water tested included 16 types of spring water, 11 identified as purified and/or fortified tap water, five were carbonated water and three were distilled water. The study indicated that six spring waters and three brands of bottled tap water showed minor bacterial contamination. However, none of the carbonated or distilled waters were found to contain detectable levels of bacteria. The identified bacteria in the spring waters included five types of Gram-negative bacteria (i.e. *Klebsiella terrigena, Ralstonia pickettii, Acidovorax temperans,* and *Acidovorax delafieldii* and *Agrobacterium rhizogenes*) and two types of Gram-positives (i.e. *Burkholderia glumae* and *Bacillus thermoglucosidasius*).

Bacteria can exhibit motility by moving from outside surface of a bottle to the inside. Current seals might afford insufficient protection. Once it encounters the packaged liquid (e.g. milk, water), the bacteria can multiply and lead to spoilage.

In addition to bacterial motility, the packaging materials (bottles, caps, seals) can become contaminated with microbes during the manufacturing process. Most companies conduct injection and blow molding of their materials in clean rooms, but there can be opportunistic contamination of surfaces by bacteria.

Thus, there is a need for an improved bottle that has a reduced risk of infiltration by bacteria and extends the shelf life of the packaged liquid contained therein.

SUMMARY OF THE INVENTION

The present invention relates to an antimicrobial bottle and seal.

In an embodiment of the invention, a bottle having an antimicrobial property comprises a body having a mouth, a neck, a shoulder, and a wall; a cap for attachment to the body; a seal located within the cap; and a locking ring for attachment to the cap, wherein an antimicrobial agent is present in a component of the bottle selected from the group consisting of the body, the cap, the seal, the locking ring, and a combination thereof.

In an embodiment of the invention, a bottle having an antimicrobial property comprises a body having a mouth, a neck, a shoulder, and a wall; a cap for attachment to the body; a seal located within the cap; and a locking ring attached to the cap, wherein a component of the bottle selected from the group consisting of the body, the cap, the seal, the locking ring, and a combination thereof is surface treated with an antimicrobial agent.

In an embodiment of the invention, a seal for a bottle comprises an antimicrobial agent.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

Figure 1:
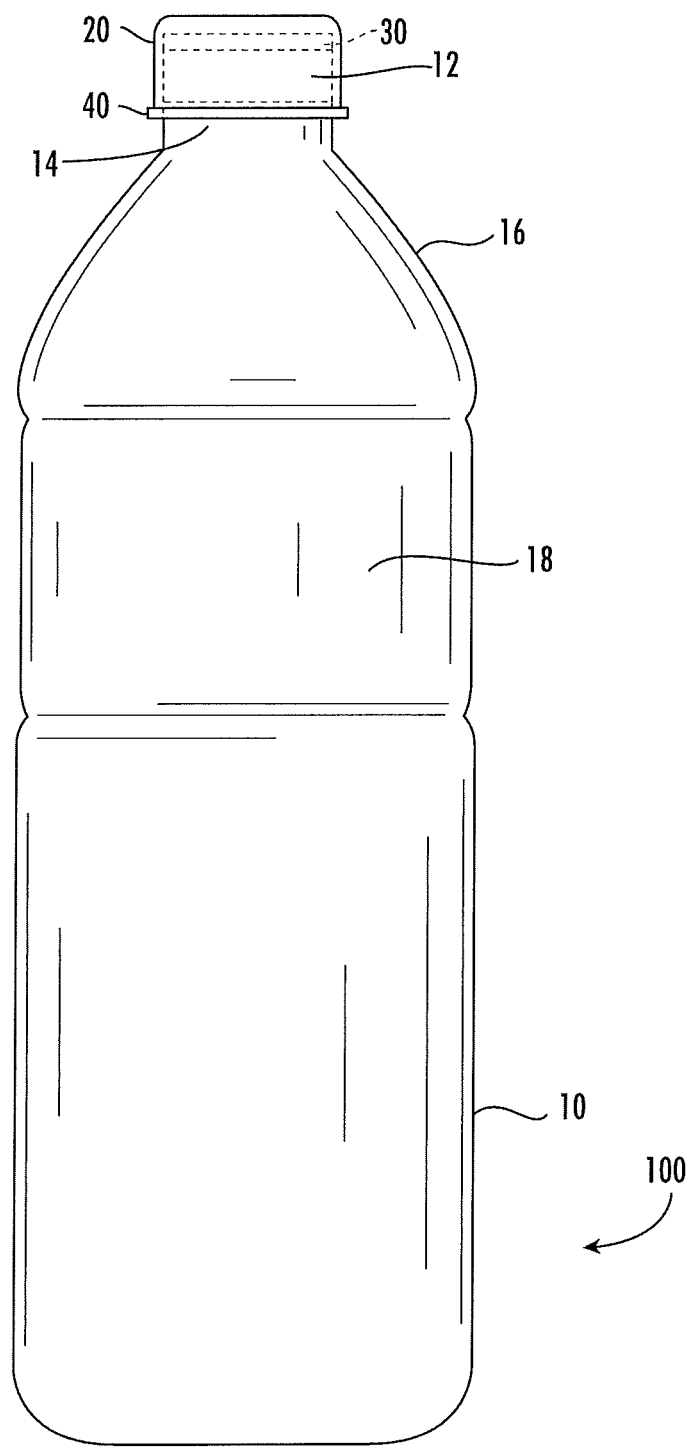
FIG. 1 is an illustration of a bottle having an antimicrobial property with a cap having an antimicrobial property attached thereto, in accordance with the present invention.

The following description of the embodiments of the present invention is merely exemplary in nature and is in no way intended to limit the invention, its application, or uses. The present invention has broad potential application and utility, which is contemplated to be adaptable across a wide range of industries. The following description is provided herein solely by way of example for purposes of providing an enabling disclosure of the invention, but does not limit the scope or substance of the invention.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mold, mildew and algae. Viral particles and other infectious agents are also included in the term microbe.

"Antimicrobial" further should be understood to encompass both microbicidal and microbistatic properties. That is, the term comprehends microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad spectrum activity (e.g. against bacteria and fungi). When speaking of efficacy against a particular microorganism or taxonomic rank, the more focused term will be used (e.g. antifungal to denote efficacy against fungal growth in particular).

Using the above example, it should be understood that efficacy against fungi does not in any way preclude the possibility that the same antimicrobial composition may demonstrate efficacy against another class of microbes.

For example, discussion of the strong bacterial efficacy demonstrated by a disclosed embodiment should not be read to exclude that embodiment from also demonstrating antifungal activity. This method of presentation should not be interpreted as limiting the scope of the invention in any way.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

In an embodiment of the present invention, a bottle having an antimicrobial property is provided. Preferably, the bottle is for containing a beverage. Referring to the figures, FIG. 1 illustrates a bottle 100 having an antimicrobial property in accordance with the present invention. Bottle 100 has a body 10 having a mouth 12, a neck 14, a shoulder 16, and a wall 18, a cap 20, a seal 30, and a locking ring 40. Seal 30 is present in cap 20. Seal 30 is circular, preferably donut-shaped. The bottle may be of any size or shape. Preferred shapes are those that are typical for a water bottle or milk bottle.

Bottle 100 comprises a polymeric or a plastic material. Examples of such materials include, but are not limited to, polypropylene, low density polyethylene (LDPE), high density polyethylene (HDPE), polyethylene terephthalate, polypropylene, polycarbonate, copolyester (e,g., Eastman Tritan), polyvinyl chloride (PVC), polybutylene terephthalate (PBT), silicone, and combinations thereof. Preferably, bottle 100 comprises low density polyethylene or polyethylene terephthalate.

Cap 20 and locking ring 40 each comprise a polymeric or a plastic material. Examples of such materials include, but are not limited to, polypropylene, low density polyethylene (LDPE), high density polyethylene (HDPE), polyethylene terephthalate, polypropylene, polycarbonate, Tritan Copolyester (Eastman), polyvinyl chloride (PVC), polybutylene terephthalate (PBT), silicone, and combinations thereof. Preferably, cap 20 and locking ring 40 each comprise polypropylene.

An antimicrobial agent is present in bottle 100 in order to provide an antimicrobial property. More particularly, the antimicrobial agent is present in one or more components of the bottle 100. For example, the antimicrobial agent may be present in or applied to a component selected from the group consisting of body 10 including but not limited to wall 18, cap 20 and/or seal 30 inside of cap 20, seal 30, locking ring 40, and a combination thereof.

Figure 2:
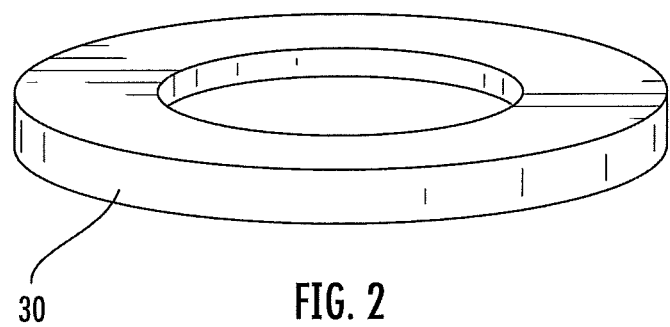
FIG. 2 is an illustration of a seal having an antimicrobial property for use in the cap of FIG. 1.
Figure 3:
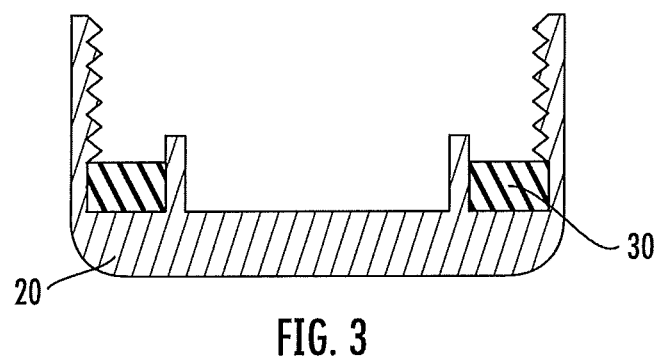
FIG. 3 is a sectional view of the cap shown in FIG. 1.

In an embodiment of the invention, seal 30 having an antimicrobial property and an elastic property is provided. FIG. 2 is an illustration of seal 30 for use in cap 20 of bottle 100 of FIG. 1. FIG. 3 is a sectional view of cap 20 shown in FIG. 1.

Seal 30 provides a sealed interface when cap 20 is tightened down to bottle 100 forcing motile external bacteria to encounter this interface and providing the surest protection. Non-limiting examples of materials for seal 30 are thermoplastic elastomer (TPE), polyurethane (PU), polyvinylchloride (PVC), and silicone.

In an embodiment of the invention, the antimicrobial is a silver-glass antimicrobial. Non-limiting examples of commercially available silver-glass additives are MICROBAN® Additive IB10, MICROBAN® Additive IB12, MICROBAN® Additive IB14, MICROBAN® Additive IB15 and similar variants. The antimicrobial additive may be incorporated into a masterbatch that is added to the polymeric or plastic material. Alternatively, the components may be surface treated with the antimicrobial additive.

The silver-glass antimicrobial inhibits motility of bacteria into the inner contents of bottle 100 such as water.

In addition to the silver-glass antimicrobial, other silver based antimicrobials can be used as well as antimicrobial agents such as zinc pyrithione, triclosan.

The antimicrobial bottle with antimicrobial seal and other components lengthen the shelf life of water and other liquid products (e.g. milk) that are susceptible to bacterial attack or spoilage. Lengthening of shelf life can translate to millions of dollars of savings down the beverage distribution chain and retailer. This invention makes liquid products safer and lowers incidence of food poisoning.

EXAMPLE

Shelf life extension trials of HDPE blowmoulded bottles made with MICROBAN® Additive IB14 silver-glass antimicrobial were conducted. Initial trials show lengthening of shelf life of milk by over a week. The silver-glass antimicrobial was present in a masterbatch and was added in three different dosages of 1%, 3% and 5% to the walls of the bottles and in the caps. Pasteurised white milk was packed in the 2 L and 3 L HDPE bottles. Anti-microbial activity and efficacy using test method JIS Z2801 was conducted at 35 degrees Celsius against Coliform, *Escherichia, Staphylococcus, Salmonella,* and *Listeria.* Trials showed lengthening of shelf life of milk to at least 21 days of milk shelf life with the additive in the masterbatch.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A bottle having an antimicrobial property for reducing food spoilage in the bottle and increasing shelf life of the food in the bottle comprising:
a body having a wall,
a cap for attachment to the body, the cap comprising one or more teeth for releasably coupling the cap to the body,
a seal located within the cap, wherein the seal is annular shaped and positioned intermediate a smooth inner wall and an outer wall proximate the one or more teeth of the cap to provide a sealed interface when the cap is tightened down to the body, and
a locking ring for attachment to the cap, wherein the locking ring locks the cap onto the body until the cap has been removed,
wherein an antimicrobial agent is present in the wall of the body, in the cap, in the seal, and in the locking ring,
wherein the antimicrobial agent is selected from the group consisting of a silver based antimicrobial, a silver-glass antimicrobial, zinc pyrithione, triclosan, and a combination thereof, and
wherein the antimicrobial agent is present at a concentration ranging from 1 wt % to 5 wt %.

2. The bottle according to claim 1, wherein the antimicrobial agent is present in the seal.

3. The bottle according to claim 1, wherein the bottle is comprised of a polymeric material.

4. The bottle according to claim 3, wherein the polymeric material is selected from the group consisting of polypropylene, low density polyethylene (LDPE), high density polyethylene (HDPE), polyethylene terephthalate, polypropylene, polycarbonate, copolyester, polyvinyl chloride (PVC), polybutylene terephthalate (PBT), silicone, and a combination thereof.

5. The bottle according to claim 2, wherein the seal has an elastic property.

6. The bottle according to claim 1, wherein the seal is comprised of a material selected from the group consisting of thermoplastic elastomer (TPE), polyurethane (PU), polyvinylchloride (PVC), silicone, and a combination thereof.

7. A bottle having an antimicrobial property comprising:
a body,
a cap for attachment to the body, the cap comprising one or more teeth for releasably coupling the cap to the body, wherein the one or more teeth are proximate an interior surface of an outer wall of the cap;
a seal located within the cap, wherein the seal is positioned intermediate an inner wall and the outer wall of the cap proximate the one or more teeth of the cap; and
a locking ring attached to the cap, wherein the locking ring locks the cap onto the body until the cap has been removed,
wherein the body, the cap, the seal, and the locking ring is surface treated with an antimicrobial agent,
wherein the antimicrobial agent is present in a wall of the body,
wherein the antimicrobial agent is selected from the group consisting of a silver based antimicrobial, a silver-glass antimicrobial, zinc pyrithione, triclosan, and a combination thereof, and
wherein the antimicrobial agent is present at a concentration ranging from 1 wt % to 5 wt %.

8. The bottle according to claim 7, wherein the bottle is comprised of a polymeric material.

9. The bottle according to claim 8, wherein the polymeric material is selected from the group consisting of polypropylene, low density polyethylene (LDPE), high density polyethylene (HDPE), polyethylene terephthalate, polypropylene, polycarbonate, copolyester, polyvinyl chloride (PVC), polybutylene terephthalate (PBT), silicone, and a combination thereof.

10. The bottle according to claim 7, wherein the seal has an elastic property.

11. The bottle according to claim 7, wherein the seal is circular.

12. The bottle according to claim 7, wherein the seal is donut-shaped.

13. The bottle according to claim 7, wherein the seal is comprised of a material selected from the group consisting of thermoplastic elastomer (TPE), polyurethane (PU), polyvinylchloride (PVC), silicone, and a combination thereof.

14. A bottle having an antimicrobial property comprising:
a body having a wall,
a cap for attachment to the body, the cap comprising one or more teeth for releasably coupling the cap to the body, wherein the one or more teeth are proximate an inner surface of an outer wall of the cap,
a seal located within the cap, wherein the seal is positioned intermediate an inner wall and the outer wall of the cap proximate the one or more teeth, and
a locking ring for attachment to the cap, wherein the locking ring locks the cap onto the body until the cap has been removed, and
a food safe liquid contained within the bottle,
wherein an antimicrobial agent is present in the wall of the body, the cap, the seal, and the locking ring,
wherein the antimicrobial agent is selected from the group consisting of a silver based antimicrobial, a silver-glass antimicrobial, zinc pyrithione, triclosan, and a combination thereof, and
wherein the antimicrobial agent is present at a concentration ranging from 1 wt % to 5 wt %.

15. The bottle according to claim 14, wherein shelf life of milk is increased by over a week when compared to a bottle omitting the antimicrobial agent.

* * * * *